US009173126B2

United States Patent
Tabet et al.

(10) Patent No.: US 9,173,126 B2
(45) Date of Patent: Oct. 27, 2015

(54) MODULATION AND CODING SCHEME (MCS) RECOVERY BASED ON CQI OFFSET

(71) Applicant: Apple Inc., Cupertino, CA (US)

(72) Inventors: Tarik Tabet, Los Gatos, CA (US); Navid Damji, Cupertino, CA (US); Kee-bong Song, Santa Clara, CA (US); Syed Aon Mujtaba, Santa Clara, CA (US); Youngjae Kim, San Jose, CA (US); Johnson O. Sebeni, Fremont, CA (US); Yuchul Kim, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/568,631

(22) Filed: Dec. 12, 2014

(65) Prior Publication Data

US 2015/0098342 A1    Apr. 9, 2015

Related U.S. Application Data

(63) Continuation of application No. 13/664,283, filed on Oct. 30, 2012, now Pat. No. 8,929,239.

(60) Provisional application No. 61/667,164, filed on Jul. 2, 2012.

(51) Int. Cl.
*H04W 24/10* (2009.01)
*H04W 76/02* (2009.01)
(Continued)

(52) U.S. Cl.
CPC ........... *H04W 24/10* (2013.01); *H04L 43/0823* (2013.01); *H04L 47/10* (2013.01); *H04W 72/085* (2013.01); *H04W 72/1231* (2013.01); *H04W 76/028* (2013.01); *H04W 72/1284* (2013.01)

(58) Field of Classification Search
CPC .......... H04W 76/028; H04W 72/1231; H04W 72/1284; H04L 5/00; H04L 43/50; H04L 12/2697; H04L 47/10
USPC .................................................. 370/252–338
See application file for complete search history.

(56) References Cited

U.S. PATENT DOCUMENTS 7,933,606 B2    4/2011  Frederiksen et al.
7,937,111 B2    5/2011  Ishii et al.
(Continued)

FOREIGN PATENT DOCUMENTS

EP    1914948    4/2008

OTHER PUBLICATIONS

International Preliminary Report on Patentability from PCT/US2013/045676, issued Jan. 15, 2015, Apple Inc., pp. 1-9.
(Continued)

*Primary Examiner* — Afsar M Qureshi
(74) *Attorney, Agent, or Firm* — Meyertons, Hood, Kivlin, Kowert & Goetzel, P.C.; Jeffrey C. Hood

(57) ABSTRACT

Manipulating modulation and coding scheme (MCS) allocation after a communication interruption. A UE device may resume communications with a BS after a communication interruption. Channel quality information may be generated and transmitted to the BS. The channel quality information may be based on channel quality measurements, and may also be based on an offset configured manipulate an MCS allocation by the BS based on determining that the interruption to communication between the UE and the BS has occurred.

20 Claims, 7 Drawing Sheets

(51) Int. Cl.
*H04W 72/12* (2009.01)
*H04L 12/801* (2013.01)
*H04L 12/26* (2006.01)
*H04W 72/08* (2009.01)

(56) References Cited

U.S. PATENT DOCUMENTS

| | | |
|---|---|---|
| 8,929,239 B2 | 1/2015 | Tabet et al. |
| 2006/0239217 A1 | 10/2006 | Hassan et al. |
| 2008/0039145 A1 | 2/2008 | Ishii et al. |
| 2009/0141673 A1 | 6/2009 | Hwang et al. |
| 2010/0067396 A1* | 3/2010 | Cui et al. ............ 370/252 |
| 2010/0130138 A1* | 5/2010 | Nandagopalan et al. ........ 455/69 |
| 2010/0157289 A1* | 6/2010 | Biel et al. ............ 356/124 |
| 2010/0157829 A1 | 6/2010 | Jonsson et al. |
| 2010/0303025 A1 | 12/2010 | Park et al. |
| 2012/0021753 A1 | 1/2012 | Damnjanovic et al. |
| 2012/0039176 A1* | 2/2012 | Eshan et al. ............ 370/237 |
| 2012/0195226 A1 | 8/2012 | Liu et al. |
| 2012/0257568 A1* | 10/2012 | Cai et al. ............ 370/328 |
| 2013/0311858 A1 | 11/2013 | Ramesh et al. |

OTHER PUBLICATIONS

Office Action from Taiwanese Application No. 102123380, issued Nov. 18, 2014, English and Chinese versions, pp. 1-11.

\* cited by examiner

| CQI Index | Modulation | Target Code Rate | IMCS | Information Bit Payload (Subframes 1,2,3,4,6,7,8,9) | Binary Channel Bits Per Sub-Frame (Subframes 1,2,3,4,6,7,8,9) | Actual Code Rate |
|---|---|---|---|---|---|---|
| 0 | out of range | out of range | DTX | - | - | - |
| 1 | QPSK | 0.0762 | 0 | 1384 | 12000 | 0.1173 |
| 2 | QPSK | 0.1172 | 0 | 1384 | 12000 | 0.1173 |
| 3 | QPSK | 0.1885 | 2 | 2216 | 12000 | 0.1867 |
| 4 | QPSK | 0.3008 | 4 | 3624 | 12000 | 0.3040 |
| 5 | QPSK | 0.4385 | 6 | 5160 | 12000 | 0.4320 |
| 6 | QPSK | 0.5879 | 8 | 6968 | 12000 | 0.5827 |
| 7 | 16QAM | 0.3691 | 11 | 8760 | 24000 | 0.3660 |
| 8 | 16QAM | 0.4785 | 13 | 11448 | 24000 | 0.4780 |
| 9 | 16QAM | 0.6016 | 15 | 14112 | 24000 | 0.5890 |
| 10 | 64QAM | 0.4551 | 18 | 16416 | 36000 | 0.4567 |
| 11 | 64QAM | 0.5537 | 20 | 19848 | 36000 | 0.5520 |
| 12 | 64QAM | 0.6504 | 22 | 22920 | 36000 | 0.6373 |
| 13 | 64QAM | 0.7539 | 24 | 27376 | 36000 | 0.7611 |
| 14 | 64QAM | 0.8525 | 26 | 30576 | 36000 | 0.8500 |
| 15 | 64QAM | 0.9258 | 27 | 31704 | 36000 | 0.8813 |

FIG. 9

MODULATION AND CODING SCHEME (MCS) RECOVERY BASED ON CQI OFFSET

PRIORITY CLAIM

The present application is a continuation of U.S. application Ser. No. 13/664,283 titled "Modulation and Coding Scheme (MCS) Recovery based on CQI Offset" and filed on Oct. 30, 2012, which claims benefit of priority to U.S. Provisional Application No. 61/667,164 titled "Modulation and Coding Scheme (MCS) Recovery based on CQI Offset" and filed on Jul. 2, 2012, both of which are hereby incorporated by reference in their entirety as though fully and completely set forth herein.

FIELD

The present application relates to wireless devices, and more particularly to a system and method for accelerating MCS recovery after a communication interruption.

DESCRIPTION OF THE RELATED ART

Wireless communication systems are rapidly growing in usage. Further, wireless communication technology has evolved from voice-only communications to also include the transmission of data, such as Internet and multimedia content. As wireless communication systems evolve, successive generations of wireless communication technologies tend to be developed. Adoption of a new generation wireless technology may be a gradual process, during which one or more previous generations of a similar technology may co-exist with the new generation technology, e.g., for a period of time until the new generation wireless technology is fully deployed.

Additionally, there exist numerous different wireless communication technologies and standards. Some examples of wireless communication standards include GSM, UMTS, LTE, CDMA2000 (e.g., 1xRTT, 1xEV-DO), IEEE 802.11 (WLAN or Wi-Fi), IEEE 802.16 (WiMAX), Bluetooth, and others. Some of these standards may serve complementary functions while others may typically be considered competitors attempting to fulfill similar needs amongst consumers.

In order to provide continuity between generations of wireless communication technologies, in order to provide complementary functionality, and/or for other reasons, it may often be desirable to provide the ability for a device to communicate using multiple wireless technologies or standards. This may be accomplished by providing separate RF circuitry for each wireless technology, and/or by providing shared RF circuitry for two or more wireless technologies implemented in the wireless device.

In some wireless communication systems, in order to provide improved communication between a base station (BS) and wireless user equipment (UE) device, the UE may calculate various metrics that indicate channel quality for feedback to the BS. The BS can use this feedback to adjust its communication with the UE to provide improved communication with the UE. For example, in some systems, these channel quality metrics may be used by the BS to determine code rates and modulation schemes to be assigned to each UE. The code rates and modulation schemes may be selected not only to maximize the throughput to a particular UE, but also to improve the overall throughput of the base station communication area (e.g., the cell) through scheduling. The use of channel quality indicators may thus allow the BS to more fully exploit the status of the wireless channel to improve communication throughput with various wireless UE devices.

However, if a wireless device is configured to communicate using multiple wireless technologies using a shared RF circuitry, it may be necessary to periodically "tune-away" the shared RF circuitry from use according to one of the wireless technologies in order to use the other. This interruption in communication can cause an out-of-sync situation and may disrupt the normal process of the UE providing channel quality feedback information to the BS to enable the BS to determine an appropriate code rate and modulation scheme for the UE device. This may result in an unwarranted penalty to the downlink (DL) capability of the UE when tuning-back to the original wireless technology.

Furthermore, in long-fade situations, the interrupted communications can result in a similar out-of-sync situation and/or penalty to the DL capability on the UE, even in cases where tuning back-and-forth between multiple wireless technologies is not a concern. Accordingly, improvements in wireless communications would be desirable.

SUMMARY OF THE DISCLOSURE

In light of the foregoing and other concerns, embodiments are presented herein of a method for manipulating downlink throughput (e.g., by way of modulation and coding scheme (MCS)) recovery after a communication interruption, and a wireless user equipment (UE) device configured to implement the method. The UE may include one or more radios, including one or more antennas, for performing wireless communications with base stations (BSs). The UE may also include device logic (which may include a processor and memory medium and/or hardware logic) configured to implement the method. Embodiments are also presented of a memory medium (e.g., a non-transitory computer accessible memory medium) comprising program instructions executable by a processor to perform part or all of the method. The method may be performed as follows.

The UE device may communicate with a first BS according to a first wireless communication protocol. It may be determined that an interruption to communication between the UE and the first BS has occurred.

The interruption may, as one possibility, be a long fade. In this case the UE may determine that the interruption is occurring by monitoring (e.g., measuring qualities indicative of) channel conditions, and may determine that the interruption (the long fade) has ended when certain conditions are met (e.g., once channel conditions have returned to within a normal range of conditions).

As another possibility, the UE may be configured to communicate using a second wireless communication protocol using a radio shared between the first and second wireless communication protocols. The communication interruption may in this case include the UE device "tuning-away" from the first BS in order to communicate with a second base station according to the second wireless communication protocol. In this case, the UE may determine that the interruption has ended when the UE device "tunes back" and resumes communicating with the first BS according to the first wireless communication protocol.

Upon resuming communicating with the first BS according to the first wireless communication protocol after the interruption, the UE may generate first channel quality information. The first channel quality information might include a CQI value, for example if the first wireless communication protocol is LTE. The first channel quality information may be generated based at least in part on a first one or more channel quality measurements.

In addition, the first channel quality information may be modified by a first offset. The first offset may be configured to manipulate a downlink throughput allocation (e.g., as reflected by an MCS allocation) by the first BS, e.g., based on determining that an interruption to communication between the UE and the first BS occurred. As one possibility, the first offset may be a small, fixed offset. Alternatively, the first channel quality information may be based entirely on the first one or more channel quality measurements. The first channel quality information may be transmitted to the first BS.

The UE may receive first downlink channel information from the first BS. The first downlink channel information may reflect a first allocated downlink throughput. The first downlink channel information may include a first MCS allocation, which may specify a type of modulation and coding to be used in downlink communications from the first BS to the UE. A MCS allocation may directly affect the downlink throughput from the first BS and the UE, and thus may effectively be considered to reflect the UE's downlink throughput allocation.

The first downlink throughput may be allocated by the BS based at least in part on the first channel quality information received from the UE. For example, MCS allocations by the first BS may be based at least in part on channel quality information received from the UE. MCS allocations by the first BS may also be based at least in part on one or more estimates of recent downlink error rate estimations, such as a block error rate estimation. The downlink error rate estimations may include estimations from the time period during which communications were interrupted, and may thus not accurately represent the current downlink error rate.

The UE may subsequently generate second channel quality information. The second channel quality information may include a CQI value, e.g., if the first wireless communication protocol is LTE. The second channel quality information may be generated based at least in part on a second one or more channel quality measurements.

The second channel quality information may also be based on (or may be modified by) a second offset. The second offset may be generated based at least in part on the first downlink channel information (e.g., on the first one or more channel quality measurements), and may be configured to modify a future downlink throughput allocation (e.g., as reflected by a MCS allocation). For example, since the first BS may include downlink error rate estimations from the time period during which communications were interrupted, the MCS allocation selected on that basis may not be the most appropriate for the actual current channel conditions. Accordingly, it may be desirable to configure the second offset to manipulate the BS MCS allocation to be more appropriate to the actual current channel conditions.

Thus, the UE may estimate an appropriate first MCS allocation based on the first channel quality information, and calculate a difference between the estimated appropriate first MCS allocation and the actual first MCS allocation. This difference may be used as a basis for generating the second offset, in order to reduce the difference between future actual and estimated appropriate MCS allocations.

In addition, the second offset may be generated at least in part based on an estimation of a downlink error rate, or possibly based on information representative of a downlink error rate. For example, downlink data blocks may include cyclic redundancy check (CRC) information, which the UE may use to confirm successful or unsuccessful receipt of data via a downlink channel from the first BS. By monitoring how many such data blocks are successfully received, and how many such data blocks are unsuccessfully received, since resuming communications with the first BS, and using such information in combination with information indicative of a target downlink error rate as part of generating the second offset, the UE may provide a check to ensure that the second offset does not over-manipulate the MCS allocation. For example, the UE device may only modify the second channel quality information by a second offset if its calculations indicate that the downlink error rate at the UE is less than (better than) or equal to a target downlink error rate.

The second channel quality information (e.g., as modified by the second offset) may be transmitted to the first BS. The first BS may subsequently allocate a next MCS for the UE based in part on the second channel quality information received. The UE may be configured to iteratively continue to receive future MCS allocations and generate future channel quality information including or modified by offsets configured to modify future MCS allocations in a similar manner for a certain amount of time, which amount may be based at least in part on a duration of the communication interruption. After that amount of time has lapsed, the UE may continue to receive future MCS allocations and generate future channel quality information, but those channel quality information transmissions may not include or be modified by any offsets.

BRIEF DESCRIPTION OF THE DRAWINGS

A better understanding of the present subject matter can be obtained when the following detailed description of the embodiments is considered in conjunction with the following drawings.

FIG. 9 illustrates an exemplary table which may be used for CQI to MCS look-up.

Figure 1:
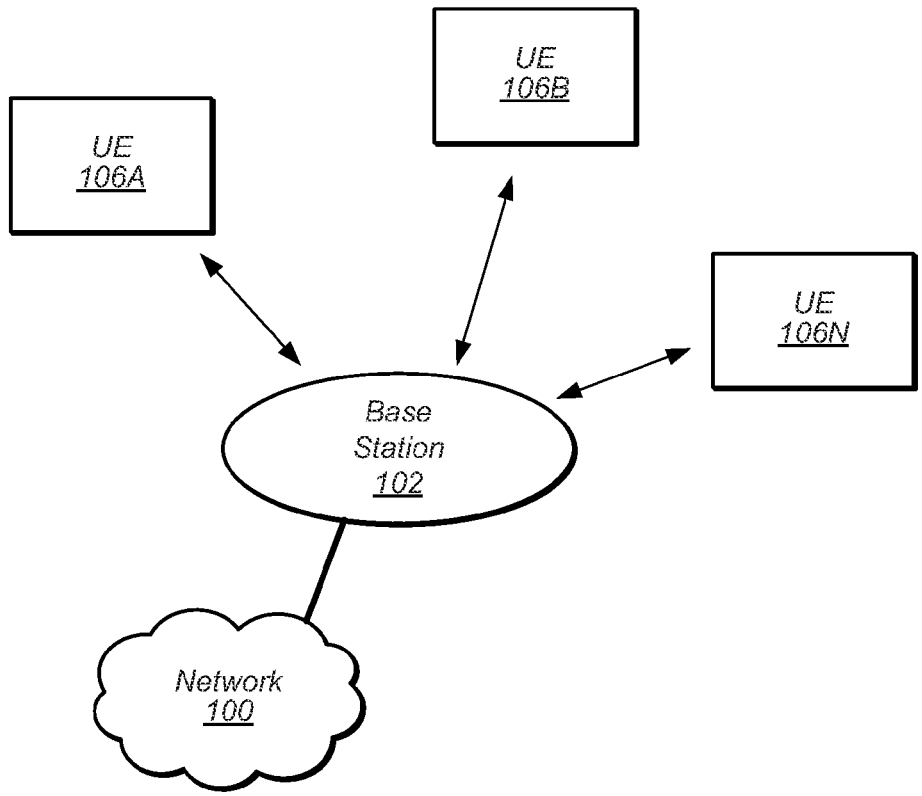
FIG. 1 illustrates an exemplary (and simplified) wireless communication system.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

The following acronyms are used in the present Patent Application:

PER: Packet Error Rate
BLER: Block Error Rate (same as Packet Error Rate)
BER: Bit Error Rate
CRC: Cyclic Redundancy Check
UL: Uplink
DL: Downlink
SNR: Signal to Noise Ratio
SIR: Signal to Interference Ratio
SINR: Signal to Interference-and-Noise Ratio
Tx: Transmission (or Transmit)
Rx: Reception (or Receive)
UE: User Equipment
UMTS: Universal Mobile Telecommunication System
LTE: Long Term Evolution
PDSCH: Physical Downlink Shared Channel Terms The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPod™), laptops, tablets (e.g., iPad™, Android™-based tablets), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Channel—a medium used to convey information from a sender (transmitter) to a receiver. It should be noted that since the definition of the term "channel" may differ according to different wireless protocols, the term "channel" as used herein should be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
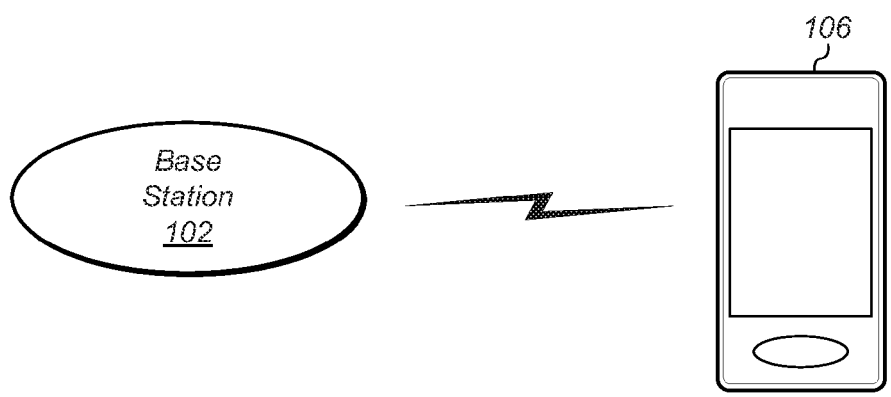
FIG. 2 illustrates a base station in communication with user equipment.

FIGS. 1 and 2—Communication System

FIG. 1 illustrates an exemplary (and simplified) wireless communication system. It is noted that the system of FIG. 1 is merely one example of a possible system, and embodiments may be implemented in any of various systems, as desired.

As shown, the exemplary wireless communication system includes a base station 102 which communicates over a transmission medium with one or more user devices 106-1 through 106-N. Each of the user devices may be referred to herein as a "user equipment" (UE). Thus, the user devices are referred to as UEs or UE devices.

The base station 102 may be a base transceiver station (BTS) or cell site, and may include hardware that enables wireless communication with the UEs 106A through 106N. The base station 102 may also be equipped to communicate with a network 100. Thus, the base station 102 may facilitate communication between the UEs and/or between the UEs and the network 100. The communication area (or coverage area) of the base station may be referred to as a "cell." The base station 102 and the UEs may be configured to communicate over the transmission medium using any of various wireless communication technologies such as GSM, CDMA, WLL, WAN, WiFi, WiMAX, etc.

UE 106 may be capable of communicating using multiple wireless communication standards. For example, a UE 106 might be configured to communicate using either of a 3GPP cellular communication standard (such as LTE) or a 3GPP2 cellular communication standard (such as a cellular communication standard in the CDMA2000 family of cellular communication standards). Thus, the UE 106 might be configured to communicate with base station 102 according to a first cellular communication standard (e.g., LTE) and might also be configured to communicate with other base stations according to a second cellular communication standard (e.g., one or more CDMA2000 cellular communication standards). Base station 102 and other similar base stations operating according to the same or a different cellular communication standard may thus be provided as a network of cells, which may provide continuous or nearly continuous overlapping service to UE 106 and similar devices over a wide geographic area via one or more cellular communication standards.

The UE 106 might also or alternatively be configured to communicate using WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates user equipment 106 (e.g., one of the devices 106-1 through 106-N) in communication with the base station 102. The UE 106 may be a device with wireless network connectivity such as a mobile phone, a hand-held device, a computer or a tablet, or virtually any type of wireless device.

The UE may include a processor that is configured to execute program instructions stored in memory. The UE may perform any of the method embodiments described herein by executing such stored instructions. Alternatively, or in addition, the UE may include a programmable hardware element such as an FPGA (field-programmable gate array) that is configured to perform any of the method embodiments described herein, or any portion of any of the method embodiments described herein.

The UE 106 may be configured to communicate using any of multiple wireless communication protocols. For example, the UE 106 may be configured to communicate using two or more of CDMA 2000, LTE, WLAN, or GNSS. Other combinations of wireless communication standards are also possible.

The UE 106 may include one or more antennas for communicating using one or more wireless communication protocols. The UE 106 may share one or more parts of a receive and/or transmit chain between multiple wireless communication standards; for example, the UE 106 might be configured to communicate using either of CDMA 2000 (1xRTT/1xEV-DO) or LTE using a single shared radio. The shared radio may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As another alternative, the UE 106 may include one or more radios which are shared between multiple wireless communication protocols, and one or more radios which are used exclusively by a single wireless communication protocol. For example, in one set of embodiments, the UE 106 may include a shared radio for communicating using either of LTE or 1xRTT, and separate radios for communicating using each of Wi-Fi and Bluetooth. Other configurations are also possible.

The UE 106 may also be configured to generate channel quality information that may be provided back to the base station 102. The base station 102 may use the channel quality information received from one or more UEs 106 to adjust its communications with the respective UE 106, or possibly other UEs 106. For example, the base station 102 might receive and utilize channel quality information from multiple UEs 106 to adjust its communication scheduling among the various UEs within its coverage area (or cell). The BS 102 may utilize channel quality information in determining a modulation and coding scheme combination for the UE 106 based at least in part on the channel quality information received from the UE 106, such as further described hereinbelow.

Figure 3:
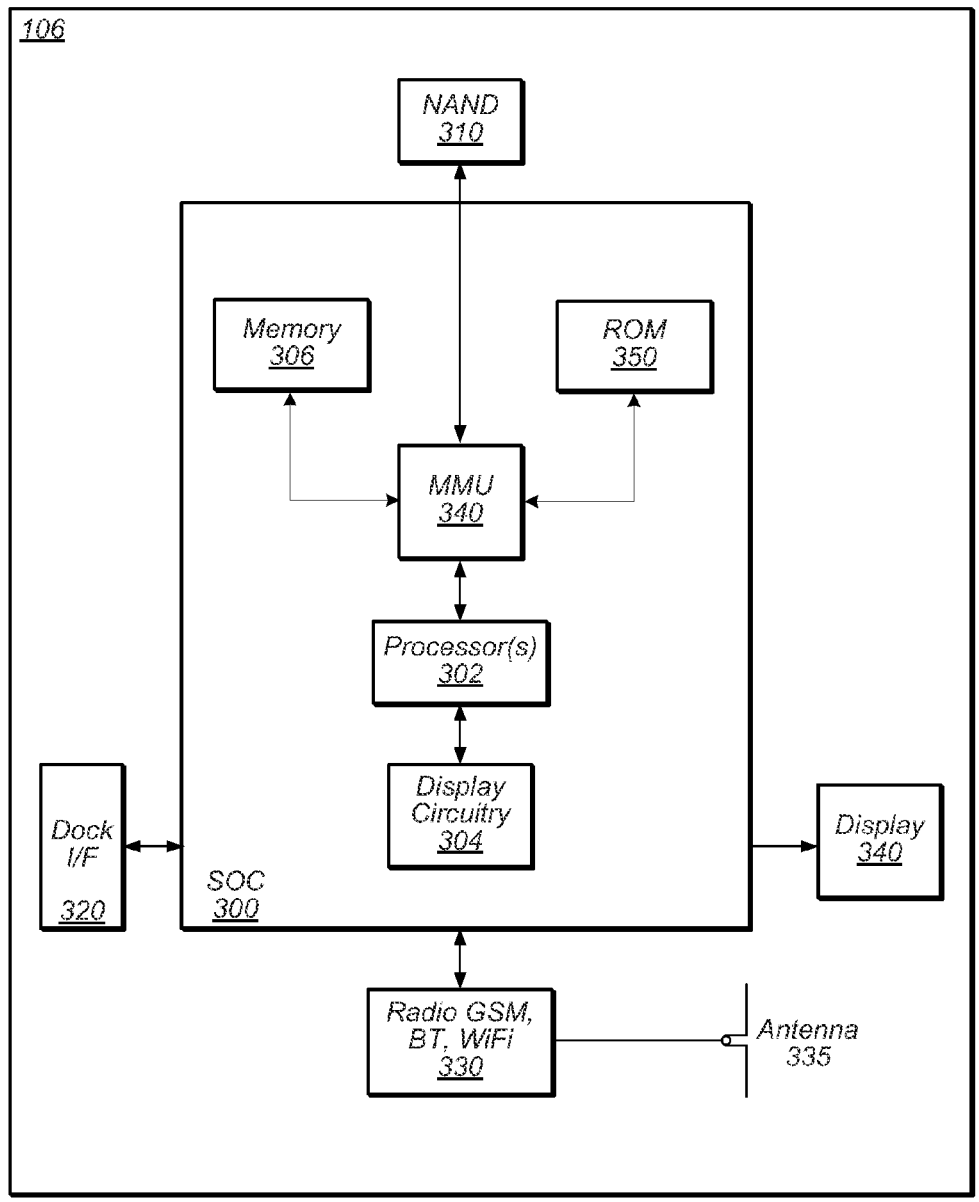
FIG. 3 illustrates an exemplary block diagram of a UE.

FIG. 3—Exemplary Block Diagram of a UE

FIG. 3 illustrates an exemplary block diagram of a UE 106. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 340. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 340. The MMU 340 may be configured to perform memory protection and page table translation or set up. In some embodiments, the MMU 340 may be included as a portion of the processor(s) 302.

As shown in FIG. 3, ROM 350 may include a bootloader, which may be executed by the processor(s) 302 during boot up or initialization. As also shown, the SOC 300 may be coupled to various other circuits of the UE 106. For example, the UE 106 may include various types of memory (e.g., including NAND flash 310), a connector interface 320 (e.g., for coupling to the computer system), the display 340, and wireless communication circuitry (e.g., for LTE, CDMA2000, Bluetooth, WiFi, etc.).

The UE device 106 may include at least one antenna, and possibly multiple antennas, for performing wireless communication with base stations and/or other devices. For example, the UE device 106 may use antenna 335 to perform the wireless communication. As noted above, the UE may be configured to communicate wirelessly using multiple wireless communication standards.

Figure 5:
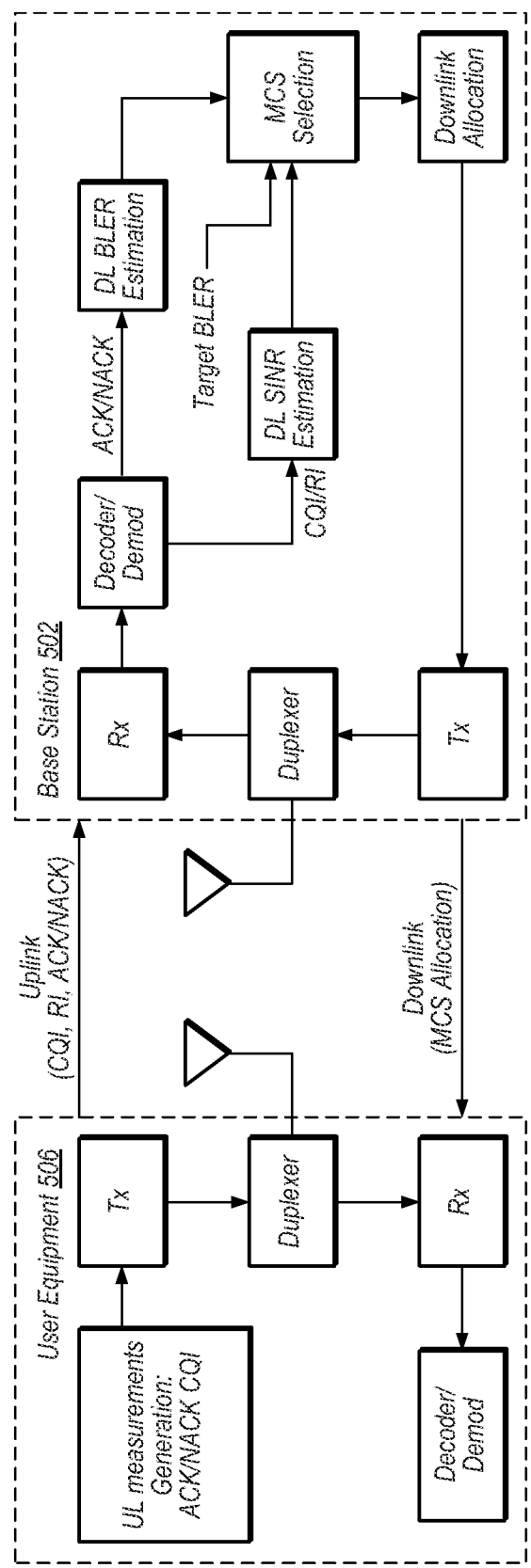
FIG. 5 is a system diagram illustrating communications between a BS and a UE.

As described herein, the UE 106 may include hardware and software components for implementing a method generating a channel quality feedback offset according to embodiments of this disclosure. FIG. 5 and the description provided with respect thereto relate to one such method according to one set of embodiments.

The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit).

FIG. 4—Flowchart

Figure 4:
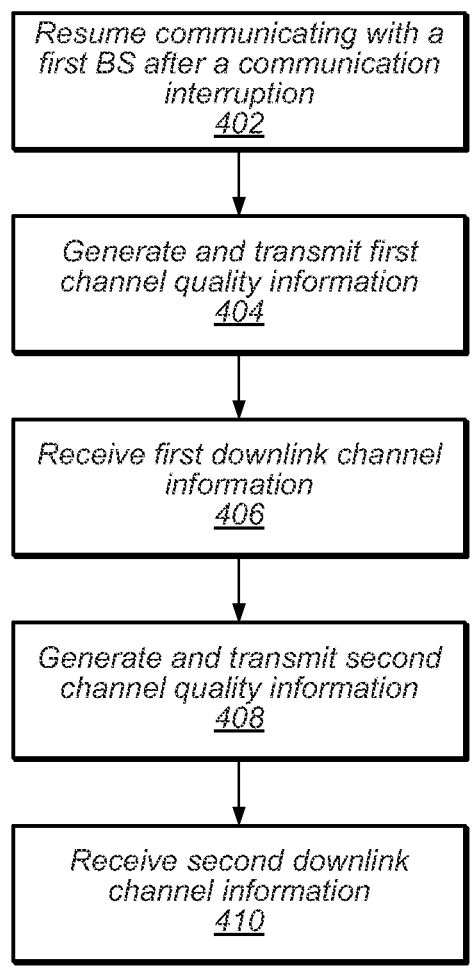
FIG. 4 is a flowchart diagram illustrating a method for accelerating MCS recovery after a communication interruption.

FIG. 4 is a flowchart diagram illustrating a method for manipulating downlink throughput allocation after a communication interruption that may be performed by a wireless UE device (such as UE 106). The method shown in FIG. 4 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

The UE device may initially communicate with a first base station (BS) according to a first wireless communication protocol. At some point, an interruption to communication between the UE and the first BS may occur. The interruption to communication may be caused by any of a number of reasons. In some embodiments, the interruption may be a "discontinuous interruption". In this context, the term discontinuous interruption is used to refer to an interruption which is not expected to have any continuing effect on channel conditions after the interruption is ended. For example, the discontinuous interruption may have been caused by a one-time natural or man-made event affecting channel conditions, or may have been caused by the UE device actively interrupting communications.

For example, the interruption might be a long fade. In this case the UE may determine that the interruption is occurring by monitoring (e.g., measuring qualities indicative of) channel conditions, and may determine that the interruption (the long fade) has ended when certain conditions are met (e.g., once channel conditions have returned to within a normal range of conditions). In many cases, after a long fade is over, there may be substantially no residual effects on channel conditions, and so a long fade may in some cases be considered a discontinuous interruption.

As another possibility, as noted above, a discontinuous interruption may be caused by the UE device actively interrupting communications. For example, the UE may also be configured to communicate using a second wireless communication protocol using a radio shared between the first and second wireless communication protocols. The communication interruption may in this case include the UE device "tuning-away" from the first BS in order to communicate with a second base station according to the second wireless communication protocol. In this case, the UE may determine that the interruption has ended when the UE device "tunes-back" and resumes communicating with the first BS according to the first wireless communication protocol. In this case, having "tuned-away" may not have any effect on the channel conditions present once the UE "tunes-back", and so this may be considered a discontinuous interruption.

In 402, the UE device may resume communicating with the first BS according to the first wireless communication protocol after the interruption.

In 404, the UE may generate first channel quality information. The first channel quality information may include a CQI value, e.g., if the first wireless communication protocol is LTE. Any number of variations, alternatives, and/or supplements to CQI values may also or alternatively be used (e.g., in different communication systems, such as CDMA2000 or WiMAX), as desired. The first channel quality information may be generated based at least in part on a first one or more channel quality measurements, such as signal to noise ratio (SNR) or signal to interference plus noise ratio (SINR), spectral efficiency (SE) estimation, and/or any of various other measurements or estimations indicative of channel quality.

In addition, if desired, the first channel quality information may be modified by a first offset. The first offset may be configured to manipulate a downlink throughput allocation (e.g., as reflected by a MCS allocation) by the first BS, e.g., based on determining that an interruption to communication between the UE and the first BS occurred. As one example, the first offset may be a small, fixed offset. Alternatively, the first channel quality information may be based entirely on the first one or more channel quality measurements, if desired. The first channel quality information may be transmitted to the first BS.

In 406, the UE may receive first downlink channel information from the first BS. The first downlink channel information may reflect a first allocated downlink throughput. For example, the first downlink channel information may include a first MCS allocation, which may specify a type of modulation and coding to be used in downlink communications from the first BS to the UE. A MCS allocation may directly affect the downlink throughput from the first BS and the UE, and thus may effectively be considered to reflect the UE's downlink throughput allocation. For example, in LTE, any of QPSK, 16 QAM, or 64 QAM modulation schemes may be used, in combination with a variety of coding rates. Each combination may result in a different effective throughput between the UE and the first BS, depending on the error rate. Ideally, the BS may select an MCS allocation which maximizes throughput (possibly depending on QoS or service terms for the UE device) while maintaining a reasonable error rate. Note that other types of downlink channel information reflective of allocated downlink throughput may be used instead of or in addition to a MCS if desired.

The first downlink throughput may be allocated by the BS based at least in part on the first channel quality information received from the UE. For example, MCS allocations by the first BS may be based at least in part on channel quality information received from the UE. MCS allocations by the first BS may also be based at least in part on one or more estimates of recent downlink error rate estimations, such as one or more block error rate estimations. Ideally, the BS estimation of recent downlink error rate would reflect actual channel conditions over a relevant period of time. However, if the downlink error rate estimations include estimations from the time period during which communications were interrupted, they may reflect channel conditions over a period of time of which at least part may not reflect current channel conditions.

For example, the UE might not report any information relating to success or failure rates (e.g., ACK/NACK information) of downlink data during the time period during which communications were interrupted. So downlink error rate estimation by the BS during that period of time may increase, since the BS may assume the lack of success or failure rate reporting to be an indicator of failed downlink communication. Thus, if the lack of success or failure rate reporting is a result of a discontinuous communication interruption and not a result of ongoing poor channel conditions, use of downlink error rate estimations by the BS which include at least part of the time period during which communications were interrupted may not reflect actual channel conditions, e.g., once the UE tunes back.

In 408, the UE may generate second channel quality information. Much like the first channel quality information, the second channel quality information may include a CQI value (e.g., if the first wireless communication protocol is LTE), and/or any other type of channel quality information. The second channel quality information may be generated based at least in part on a second one or more channel quality measurements, which may include any of a variety of measurements or estimations indicative of channel quality, in a similar manner as the first one or more channel quality measurements.

The second channel quality information may also be based on (or may be modified by) a second offset. The second offset may be generated based at least in part on the first downlink channel information (e.g., on the first one or more channel quality measurements), and may be configured to modify a future downlink throughput allocation (e.g., as reflected by a MCS allocation). For example, since the first BS may include downlink error rate estimations from the time period during which communications were interrupted, the MCS allocation selected on that basis may not be the most appropriate for the actual current channel conditions. Accordingly, it may be desirable to configure the second offset to manipulate the BS MCS allocation to be more appropriate to the actual current channel conditions.

Thus, the UE may estimate an appropriate first MCS allocation based on the first channel quality information, and calculate a difference between the estimated appropriate first MCS allocation and the actual first MCS allocation. This difference may be used as a basis for generating the second offset, e.g., in order to reduce the difference between future actual and estimated appropriate MCS allocations.

In addition, the second offset may be generated at least in part based on an estimation of a downlink error rate, or possibly based on information representative of a downlink error rate. For example, downlink data blocks may include cyclic redundancy check (CRC) information, which the UE may use to confirm successful or unsuccessful receipt of data via a downlink channel from the first BS. By monitoring how many such data blocks are successfully received, and how many such data blocks are unsuccessfully received, since resuming communications with the first BS, and using such information in combination with information indicative of a target downlink error rate as part of generating the second offset, the UE may provide a check to ensure that the second offset does not over-manipulate the MCS allocation. For example, the UE device might only modify the second channel quality information by a second offset if its calculations indicate that the downlink error rate at the UE is less than (better than) or equal to a target downlink error rate. Downlink error rate estimations and target downlink error rate may also or alternatively be utilized in different ways in generating the second offset, as desired. The second channel quality information (e.g., as modified by the second offset) may be transmitted to the first BS.

In 410, the UE may receive second downlink channel information. For example, the BS may allocate and transmit a second MCS to the UE. The second MCS may be selected by the BS based in part on the second channel quality information received from the UE. Since the second channel quality information may include the second offset, the second MCS may more closely approach an estimated appropriate second MCS (e.g., which may be generated in a similar manner as described above with respect to the estimated appropriate first MCS) than the first MCS may approach the estimated appropriate first MCS.

The UE may be configured to iteratively continue to receive future MCS allocations and generate future channel quality information including or modified by offsets configured to modify future MCS allocations in a similar manner for a certain amount of time. The amount of time for which this may occur may be based at least in part on a duration of the communication interruption. After that amount of time has lapsed, the UE may continue to receive future MCS allocations and generate future channel quality information, but those channel quality information transmissions may not include or be modified by offsets such as those described hereinabove.

Note that the UE may not need to modify the channel quality information by an offset in all cases, even within the amount of time for which the UE is configured to do so. For example, if an estimated appropriate MCS matches an actual MCS, there may be no need to manipulate a next channel quality information report, as the actual MCS may be the appropriate MCS for the channel conditions which the UE is experiencing at that time.

Thus, by utilizing the method of FIG. 4 as provided above according to various embodiments, a UE may advantageously rapidly recover from and/or avoid unwarranted MCS penalties imposed by the BS as a result of a discontinuous interruption to communication between the BS and the UE.

FIGS. 5-9—Exemplary Implementation

FIGS. 5-9 illustrate aspects of a selected exemplary implementation of the method of FIG. 4. While numerous specific details of the exemplary set of embodiments of FIGS. 5-9 are provided herein below by way of example, it will be recognized by those of skill in the art that any number of variations on or alternatives to the specific details of the exemplary embodiments of FIGS. 5-9 may be implemented if desired, and that accordingly the description provided with respect thereto should not be considered limiting to the disclosure as a whole.

In the exemplary set of embodiments of FIGS. 5-9, a UE device may be configured to communicate with base stations via the LTE wireless communication protocol. Base stations that operate according to LTE may also be referred to herein as "eNodeBs" or "eNBs". The UE device may also be configured to communicate with base stations using another cellular communication protocol, such as CDMA2000 (e.g., including 1xRTT and/or 1xEV-DO), though this may not be necessary. Note that it may be the case that base stations may either operate according to LTE or according to CDMA2000, but not both.

As part of the LTE protocol, the UE device may occasionally (periodically or aperiodically) send channel state feedback reports, which may include information reflecting the quality of the downlink channel state at the receiver. One example of such a metric which is used in LTE is a channel quality indicator (CQI). The CQI is defined in LTE as a value between 0 and 15 that may be reflective primarily of channel quality. It may be based on channel estimation, noise estimation, signal-to-noise ratio (SNR) estimation, signal-to-interference-plus-noise ratio (SINR) estimation, and/or other factors, depending on the implementation. The eNB may estimate (e.g., using a mapping table) downlink (DL) SINR at the UE based on the CQI reported by the UE. Another example of a channel state metric that may be used in some embodiments is rank indication (RI), which may be an indicator of the number of transmission layers that the UE can support to optimize throughput.

Another element of the LTE protocol includes the use of positive acknowledgement ("ACK") and negative acknowledgement ("NACK") messages. The UE may confirm successful receipt of a block of data (e.g., a transport block) by transmitting an ACK message to the eNB. Similarly, the UE may inform the eNB of failed receipt of a block of data by transmitting a NACK message to the eNB. The UE may make use of cyclic redundancy check (CRC) suffixes in the data blocks in determining successful or unsuccessful receipt of each data block. The ACK and NACK messages may be used in turn by the eNB to estimate a DL block error rate (BLER) at the UE.

A process referred to generally in wireless networks as link adaptation may be used to select an appropriate modulation and coding scheme (MCS) and power for a UE device to achieve a target quality of service (QoS) and BLER. In particular, an aspect of this process referred to as outer loop link adaptation may be used by the eNB to determine an MCS for a UE based on the UE's reported CQI (and possibly RI) and an estimated DL BLER. The determination may be based on one or more mapping tables, such as a table mapping CQI to MCS, such as shown in FIG. 9, and/or a table mapping the effects of changes in RI to MCS.

FIG. 5 is a system diagram illustrating a BS 502 and a UE device 506 engaged in such outer loop link adaptation related communications. As shown, the BS 502 and the UE 506 may each include one or more antennas and various functional blocks for performing wireless communications, including functional blocks for generating ACK/NACK messages and performing CQI estimation at the UE 506, and functional blocks for estimating DL BLER, estimating DL SINR, selecting an MCS, and allocating DL resources to the UE 501 at the BS 502. Those skilled in the art will recognize that UE 506 and BS 502 may typically include numerous other system components, which are not shown in FIG. 5 in order to avoid obscuring the details of the exemplary implementation.

As shown, the UE 506 may generate ACK/NACK messages, CQI measurements, and RI measurements and transmit such information via an uplink channel. The BS 502 may use the ACK/NACK messages to estimate the DL BLER (e.g., based on how many blocks were received successfully vs. unsuccessfully), and may use the CQI to estimate the DL SINR (e.g., using a predefined mapping). The BS 502 may then select an MCS for the UE 506 based on the DL BLER, the DL SINR, and a target BLER.

For example, according to one set of embodiments, the estimated BLER and the target BLER may be used to select an offset to the DL SINR. Depending on whether the measured BLER is lower (better) or higher (worse) than the target BLER, the offset may be positive or negative respectively. The offset may be applied to the estimated DL SINR, which may then be used to select the MCS based on a SINR-MCS mapping.

The UE 506 may then be provided with the MCS allocation and DL scheduling information from the BS 502 via the DL channel, and may subsequently receive further data from the BS 502 via the DL channel according to the allocated MCS and scheduling information. The UE 506 may subsequently perform further CQI measurements and generate further ACK/NACK messages based on the information received via the DL channel, and transmit such information to the BS 502 via the UL channel, providing a steady-state cycle in which MCS may be dynamically adjusted in accordance with varying channel conditions.

This system works well as long as there are no discontinuous interruptions in communications between the UE 506 and the BS 502. However, in a situation in which a long fade occurs, the interruption in communication between the UE 506 and the BS 502 can result in the UE 506 losing synchronization with the BS 502, causing the estimation of DL BLER at the BS 502 to grow to a large value (possibly 100%).

Additionally, some UEs are configured to use a single radio to communicate according to multiple cellular communication protocols; for example, according to one set of embodiments, UE 506 may be configured to communicate using either of LTE or CDMA2000 using a single radio. In this case, it may be common for the UE 506 to usually use one of the cellular communication protocols (e.g., LTE), but to "tune-away" the radio occasionally to use the other cellular communication protocol (e.g., CDMA2000 1xRTT), e.g., to listen to a paging channel. During such a "tune-away", the connection of the UE 506 with the original cellular communication protocol may be interrupted. Similar to a long fade, this may cause a loss of synchronization between the UE 506 and the BS 502 may result in the BS 502 estimating the DL BLER of the UE 506 to be very high (again, possibly 100%).

Thus, in certain cases in which a discontinuous interruption in communications between the UE 506 and the BS 502 occurs, the BS 502 may allocate to the UE 506 an MCS with a lower throughput than is warranted by the current channel conditions, because of a high DL BLER estimate during the interruption. This may in turn result in the UE 506 obtaining a lower (better) DL BLER than the target DL BLER, at the cost of lower than ideal DL throughput.

In such cases, in which it is known at the UE 506 that the interruption in communications is not reflective of current channel conditions (e.g., because it was caused by the UE 506 tuning away, or because the UE 506 detects that the fade has ended), it may be desirable for the UE 506 to make one or more adjustments to the measurements on the basis of which the BS 502 will allocate the MCS. This may allow the UE 506 to more quickly obtain an MCS with which the UE 506 may achieve both its target QoS and BLER.

An example of such an adjustment might include a CQI offset. Because the CQI is used by the BS 502 to estimate DL SINR, which in turn is used by the BS 502 to select the MCS for the UE 506, if the UE 506 modifies its measured CQI by a CQI offset, this will in turn directly and predictably affect the MCS which will be allocated to the UE 506. If the CQI offset is selected to account for the difference between the MCS allocated to the UE 506 by the BS 502 and an MCS which would reflect current DL BLER and SINR, the next MCS should more accurately reflect current channel conditions.

Figure 6:
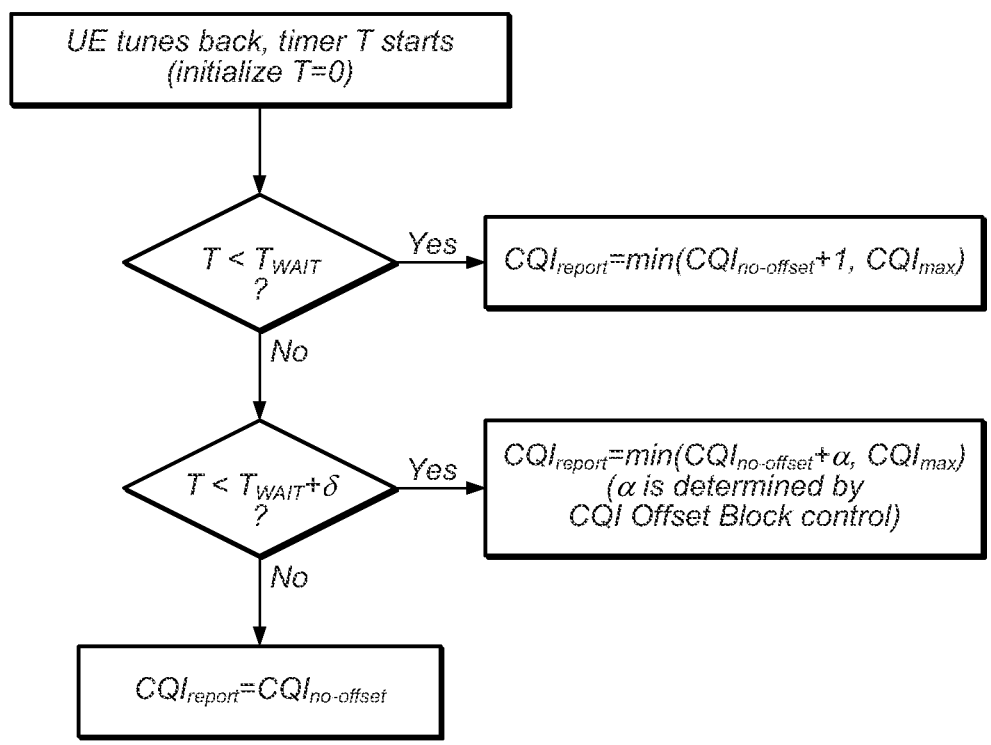
FIG. 6 is a flowchart illustrating an exemplary CQI selection process for a period of time after a tune-away or fade.
Figures 7, 8:
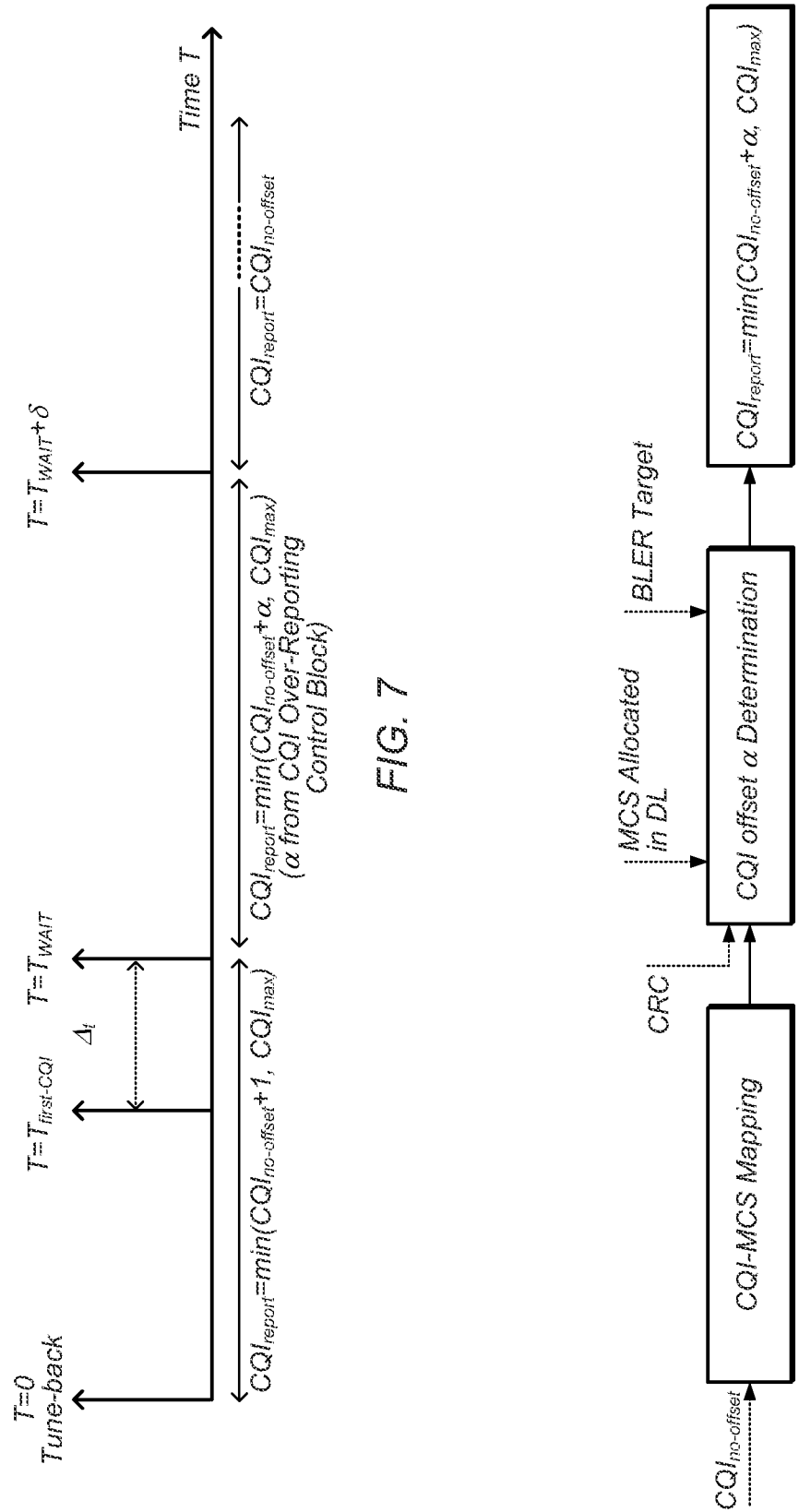
FIG. 7 is a timing diagram illustrating timing of the exemplary CQI selection process illustrated in FIG. 6.
FIG. 8 is a data flow diagram illustrating an aspect of the exemplary CQI selection process illustrated in FIG. 6.

Thus, in the exemplary embodiment of FIGS. 5-9, the UE 506 may be configured to perform such CQI modification in order to obtain appropriate MCS allocation more quickly after an interruption in communication between the UE 506 and the BS 502. The UE 506 may perform a method implementing such CQI modification for a period of time after determining that the UE 506 has "returned" from an interruption in communication with the BS 502. FIG. 6 is a flowchart diagram illustrating the steps of such a method according to one set of embodiments. FIG. 7 is a timing diagram illustrating the time frame corresponding to the method of FIG. 6. FIG. 8 is a diagram illustrating functional blocks that may be used in generating a CQI offset in conjunction with the method of FIG. 6. The method may be performed as follows.

Initially, the UE 506 may "tune-back" to LTE after "tuning-away" for a period of time, e.g., to check for 1xRTT paging messages. At this time a timer ("T") may be initiated, with an initial condition of T=0.

For an initial period of time after tuning back, the UE 506 may not yet have received an MCS, and so may not know to what degree (if any) the BS 502 will "penalize" (relative to actual channel conditions) the UE 506 with its MCS allocation. Accordingly, for a first period of time (e.g., from T=0 until T=$T_{WAIT}$), the UE 506 may generate a CQI value in a first manner.

The first manner may include measuring the CQI as normal (referred to as "$CQI_{no-offset}$"), adding a nominal offset of +1, and transmitting to the BS 502 the lesser of the resulting CQI value or the maximum possible CQI value (e.g., 15) in the CQI report. Alternatively the first manner may include simply measuring $CQI_{no-offset}$ and transmitting that value without any offset in the CQI report. By using a low offset or no offset in this manner, the UE 506 may avoid over-compensating for the expected MCS penalty, which might result in the UE 506 being allocated an MCS for which the actual BLER would be larger than the target BLER.

The value of $T_{WAIT}$ may be selected such as to allow sufficient time for an initial CQI report by the UE 506 to be received and take effect at the BS 502 (e.g., at a scheduler at the BS 502). For example, as shown in FIG. 7, according to some embodiments $T_{WAIT}=T_{First-CQI}+\Delta T$, where $T_{First-CQI}$ is the time of occurrence of the first CQI report after tuning-back, and $\Delta T$ is a time delay to accommodate the time needed for the first CQI to take effect at the BS 502.

Once the initial CQI report has had time to take effect at the BS 502 (e.g., and the UE 506 has received an MCS from the BS 502), it may be appropriate for the UE 506 to adjust its CQI reports if the MCS allocated by the BS 502 does not reflect current channel conditions. Thus, as shown in FIGS. 6 and 7, during a second period of time (e.g., from T=$T_{WAIT}$ until T=$T_{WAIT}+\delta$, the UE 506 may generate a CQI value in a second manner).

The second manner may include measuring $CQI_{no-offset}$, adding a CQI offset ("α") whose derivation according to various embodiments will be described further subsequently herein, and transmitting to the BS 502 the lesser of the resulting CQI value or the maximum possible CQI value (e.g., 15) in the CQI report.

The CQI offset α may be selected in a manner intended to bring the MCS allocation in line with the current channel conditions. Accordingly, the process for generating the CQI offset α may, in some embodiments, include estimating what the MCS would be under the current channel conditions, determining the difference between this MCS estimate and the actual allocated MCS, and using this as a basis for determining the CQI offset α.

More particularly, as shown in FIG. 8, the UE 506 may use as inputs for calculation of the CQI offset α the values $CQI_{no-offset}$, results of CRC detections of DL transmissions (e.g., PDSCH transmissions) since tune-back, a BLER target, and the actual MCS allocated to the UE 506 by the BS 502 over the DL channel. The $CQI_{no-offset}$ value may be mapped to an MCS estimate in the CQI-MCS Mapping block, which may be passed to the CQI offset determination block along with the other inputs, as shown. The selected offset may be added to $CQI_{no-offset}$, and the lesser of the result or the maximum possible CQI value may be used in the CQI report.

It may generally be desirable that the size of the offset depends on the size of the difference between the allocated and estimated MCS. As previously noted, MCS values may be selected based on an interpretation of CQI as representative of SINR at the UE. And as also previously noted, the BS may apply, to the SINR it estimates based on the CQI report, an SINR offset based on a BLER estimate generated by the BS. In LTE, a 1 dB SINR step corresponds to one MCS step. A CQI step corresponds to 2 dB SINR. Thus, to offset the difference between the allocated and estimated MCS, a general strategy may be to divide the difference by two and apply the result as the CQI offset.

However, the exact method used to generate the CQI offset α from these values may vary depending on the implementation. For example, certain checks and limits may be applied to the calculation, depending on how aggressively it is desired to manipulate the MCS allocation. For example, if the estimated BLER does not meet or beat the target BLER, it may not be desirable to manipulate the MCS allocation. In addition, it may be desirable to limit the CQI offset α to a maximum possible value, in order to avoid overshooting the ideal MCS. In general, if the allocated MCS does not match the estimated MCS and the estimated BLER (based on the CRC results) meets or beats the target BLER, this may be an indication that an offset should be generated to manipulate the allocated MCS to more closely reflect the actual current channel conditions.

According to one set of embodiments, the CQI offset α may be calculated as follows:

let $$[x]^+ = \max(0, x)$$

$$1_{\{CRCfail\}} = \begin{cases} 1 & \text{if } CRC \text{ fails} \\ 0 & \text{otherwise} \end{cases}$$

$$1_{\{CRCpass\}} = \begin{cases} 1 & \text{if } CRC \text{ passes} \\ 0 & \text{otherwise} \end{cases}$$

then $$\alpha = \begin{cases} 1 & \text{if no DL TX scheduled since tune-back} \\ \lambda & \text{otherwise} \end{cases}$$

where $$\lambda = \begin{cases} \min(\beta, \phi) & \text{if } \gamma \geq 0 \\ 0 & \text{otherwise} \end{cases}$$

$$\beta = \left[\left[\frac{MCS_{report} - lastMCS_{alloc}}{2}\right]^+\right]$$

$$\gamma = \mu \sum_i 1_{\{CRC_i pass\}} - \sum_i 1_{\{CRC_i fail\}}$$

$$\mu = 0.11$$

$$\phi = 3$$

In this example, $lastMCS_{alloc}$ corresponds to the last MCS allocated by the BS before the present UE CQI report, while $MCS_{report}$ refers to the MCS estimate obtained by the UE by mapping the previous CQI report to an MCS value. $CRC_i$ represents the detection of the i-th new transmission of DL PDSCH since tune-back. If DL transmissions are not scheduled, this may imply MCS and CRC information may not yet be available at the UE, hence the nominal α=1 used in this case, in a similar manner and for similar reasons as during the first period of time.

The value μ may represent the target BLER; in this example, a value of 0.11 may be used for a 10% BLER target. Other values could be used as desired, e.g., for other target BLERs. The value φ may be used as an offset limit, in order to avoid grossly misrepresenting the CQI to the BS by using a very large CQI offset; while the value 3 is provided as an example, other values could easily be used.

If desired, an alternative calculation of the CQI offset α may be performed as follows:

let $$[x]^+ = \max(0, x)$$

$$1_{\{CRCfail\}} = \begin{cases} 1 & \text{if } CRC \text{ fails} \\ 0 & \text{otherwise} \end{cases}$$

$$1_{\{CRCpass\}} = \begin{cases} 1 & \text{if } CRC \text{ passes} \\ 0 & \text{otherwise} \end{cases}$$

then $$\alpha = \begin{cases} 1 & \text{if no } DL\ TX \text{ scheduled since tune-back} \\ \lambda & \text{otherwise} \end{cases}$$

where $$\lambda = \min(\beta, \gamma, \phi)$$

$$\beta = \left[\left[\frac{MCS_{report} - lastMCS_{alloc}}{2}\right]^+\right]$$

$$\gamma = \left[\left[\phi - \sum_i 1_{\{CRC_i fail\}} + \mu \sum_i 1_{\{CRC_i pass\}}\right]^+\right]$$

$$\mu = 0.11$$

$$\phi = 3$$

In this example, the calculation may be similar, but may be more aggressive in selecting the CQI offset α, in particular with respect to the BLER.

By using the CQI offset α during the second period of time, the UE 506 may recover an appropriate MCS for the actual channel conditions more rapidly than if no CQI offset were used. At the same time, by using appropriate checks and limits to ensure that a CQI offset is not over-applied or applied when the allocated MCS is appropriate to the actual channel conditions, the potential negative consequences of the UE 506 manipulating MCS allocation may be minimized.

As noted above, the second period of time may extend for a duration δ. The value of δ may be selected such that sufficient time may have passed for the BS 502 to stop using BLER estimates from the period of time while the UE 506 was tuned away, in some embodiments. This may mean that the value of δ may be dynamically determined by the UE 506 in some embodiments, e.g., based on an estimation of the length of the communication interruption (e.g., the tune-away or fade) and/or knowledge of the BLER estimation algorithm at the BS 502.

After the second period of time has ended (e.g., after the timer T reaches T=T$_{WAIT}$+δ), the UE 506 may cease using a CQI offset in generating the CQI report, and may simply use the measured CQI$_{no\text{-}offset}$ value. From this point forward (e.g., until a next tune-away or other interruption in communication), it may be the case that the allocated MCS appropriately reflects the actual channel conditions, and so there would be little or no utility in continuing to modify the CQI report with a CQI offset. However, in some embodiments, if the UE 506 tunes-away regularly (e.g., according to the schedule of a 1xRTT paging channel), the UE 506 may perform the method to rapidly recover appropriate MCS allocations each time the UE 506 tunes-back to LTE.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless user equipment (UE) device, comprising:
a radio; and
a processing element;
wherein the radio and the processing element are configured to:
communicate with a first base station (BS) according to a first radio access technology (RAT);
determine that an interruption to communication between the UE and the first BS has occurred;
resume communicating with the BS according to the first RAT after the interruption, wherein in order to resume communicating with the first BS, the radio and the processing element are further configured to:
generate first channel quality information, wherein the first channel quality information is based on a first one or more channel quality measurements,
transmit the first channel quality information to the first BS;
receive a first MCS allocation from the first BS, wherein the first MCS allocation is based at least in part on the first channel quality information;
estimate an appropriate first MCS allocation based on the first channel quality information;
generate second channel quality information, wherein the second channel quality information is based on a second one or more channel quality measurements and an offset dynamically selected based on a difference between the estimated appropriate first MCS allocation and the received first MCS allocation; and
transmit the second channel quality information to the first BS.

2. The UE of claim 1,
wherein the dynamically selected offset is configured to manipulate a next MCS allocation by the first BS based on the difference between the estimated appropriate first MCS allocation and the received first MCS allocation.

3. The UE of claim 1,
wherein the first channel quality information is also based on an offset statically selected based on determining that the interruption to communication between the UE and the first BS has occurred.

4. The UE of claim 3,
wherein the statically selected offset is configured to manipulate the first MCS allocation by the first BS towards the estimated appropriate first MCS allocation based on determining that the interruption to communication between the UE and the first BS has occurred.

5. The UE of claim 1, wherein the radio and the processing element are further configured to:
determine whether or not downlink data blocks scheduled since resuming communicating with the first BS are successfully received;
wherein the dynamically selected offset is also selected based at least in part on the determination of whether or not downlink data blocks scheduled since resuming communicating with the first BS are successfully received.

6. The UE of claim 1,
wherein the interruption to communication between the UE and the first BS comprises a long fade.

7. The UE of claim 6, wherein the radio and the processing element are further configured to:
determine that the long fade has ended;
resume communicating with the first BS based on determining that the long fade has ended.

8. The UE of claim 1,
wherein the radio and the processing element are further configured to communicate with base stations according to a second RAT;
wherein the interruption to communication between the UE and the first BS comprises a period of time during which the UE communicates with a second BS according to the second RAT.

9. A non-transitory computer accessible memory medium comprising program instructions for a user equipment (UE) device to manipulate modulation and coding scheme (MCS) selection after a communication interruption, wherein the program instructions are executable to:
communicate with a first base station (BS) according to a first wireless communication protocol;
determine that an interruption to communication between the UE and the first BS has occurred;
resume communicating with the BS according to the first wireless communication protocol after the interruption, wherein in order to resume communicating with the first BS, the program instructions are further executable to:
generate first channel quality information, wherein the first channel quality information is based on a first one or more channel quality measurements, wherein the first channel quality information is also based on a first offset, wherein the first offset is configured to manipulate a MCS allocation by the first BS based on determining that the interruption to communication between the UE and the first BS has occurred;
transmit the first channel quality information to the first BS.

10. The memory medium of claim 9, wherein in order to resume communicating with the BS, the program instructions are further executable to:
receive a first MCS allocation from the first BS, wherein the first MCS allocation is based at least in part on the first channel quality information;
estimate an appropriate first MCS allocation based on the first channel quality information;
generate second channel quality information, wherein the second channel quality information is based on a second one or more channel quality measurements, wherein the second channel quality information is also based on a second offset, wherein the second offset is configured to manipulate a next MCS allocation by the first BS based on a difference between the estimated appropriate first MCS allocation and the received first MCS allocation;
transmit the second channel quality information to the first BS.

11. The memory medium of claim 9, wherein the program instructions are further executable to:
determine whether downlink data blocks since resuming communicating with the first BS are successfully or unsuccessfully received;
wherein the second offset is based at least in part on the determination of whether downlink data blocks since resuming communicating with the first BS are successfully or unsuccessfully received.

12. The memory medium of claim 9,
wherein the interruption to communication between the UE and the first BS comprises a long fade.

13. The memory medium of claim 12, wherein the program instructions are further executable to:
determine that the long fade has ended;
wherein the program instructions are configured to resume communicating with the first BS based on determining that the long fade has ended.

14. The memory medium of claim 9,
wherein the program instructions are further executable to communicate with base stations according to a second wireless communication protocol;
wherein the interruption to communication between the UE and the first BS comprises a period of time during which the UE communicates with a second BS according to the second wireless communication protocol.

15. A method for a wireless user equipment (UE) device to manipulate modulation and coding scheme (MCS) selection after periodic communication interruptions, the method comprising:
operating according to a first radio access technology (RAT), wherein operating according to the first RAT comprises generating and transmitting channel quality reports to a base station (BS) according to the first RAT, wherein the channel quality reports are used by the BS to select an MCS allocation for the UE;
operating according to a second RAT on each of a plurality of occasions in a periodic manner, wherein each occasion comprises an interruption to operating according to the first RAT;
resuming operating according to the first RAT after each interruption;

wherein during a period of time after each interruption, at least one channel quality report is generated using an offset configured to manipulate selection of the MCS allocation;

wherein while operating according to the first RAT at times other than the period of time after each interruption, channel quality reports are generated not using offsets configured to manipulate MCS allocation.

16. The method of claim 15, wherein during the period of time after each interruption, a plurality of channel quality reports are generated using offsets configured to manipulate selection of the MCS allocation.

17. The method of claim 15, wherein the method further comprises:

determining a length of the period of time after each respective interruption based on a length of the respective interruption.

18. The method of claim 15, wherein during the period of time after each interruption, an initial channel quality report is generated using a statically selected offset and subsequent channel quality reports are generated using dynamically selected offsets.

19. The method of claim 15, wherein during the period of time after each interruption, an initial channel quality report is generated without an offset and subsequent channel quality reports are generated using dynamically selected offsets.

20. The method of claim 15, wherein the method further comprises:

estimating a downlink error rate, wherein the offset is selected based at least in part on the estimated downlink error rate and a target downlink error rate.

\* \* \* \* \*